April 22, 1969   B. E. KNIGHT   3,439,476

GAS PURIFICATION APPARATUS

Filed Nov. 24, 1967

INVENTOR
Basil Edward Knight
BY
ATTORNEYS

United States Patent Office 3,439,476
Patented Apr. 22, 1969

3,439,476
GAS PURIFICATION APPARATUS
Basil Edward Knight, Pinner, England, assignor to C.A.V.
Limited, London, England, a British company
Filed Nov. 24, 1967, Ser. No. 685,670
Claims priority, application Great Britain, Nov. 30, 1966,
53,625/66
Int. Cl. B03c 3/74, 3/36, 3/01
U.S. Cl. 55—120                                    2 Claims

ABSTRACT OF THE DISCLOSURE

Gas purification apparatus comprising tubular chamber having an air inlet tube extending into both ends thereof and inlets for gas to be purified, the tubes support electrical insulators which carry a wire electrode. A high potential difference is maintained between the wall of the chamber and the electrode. The gas to be purified acts to draw air through the tubes to maintain the insulators clean.

---

This invention relates to gas purification apparatus and has for its object to provide such apparatus in a simple and convenient form.

Figure 1:
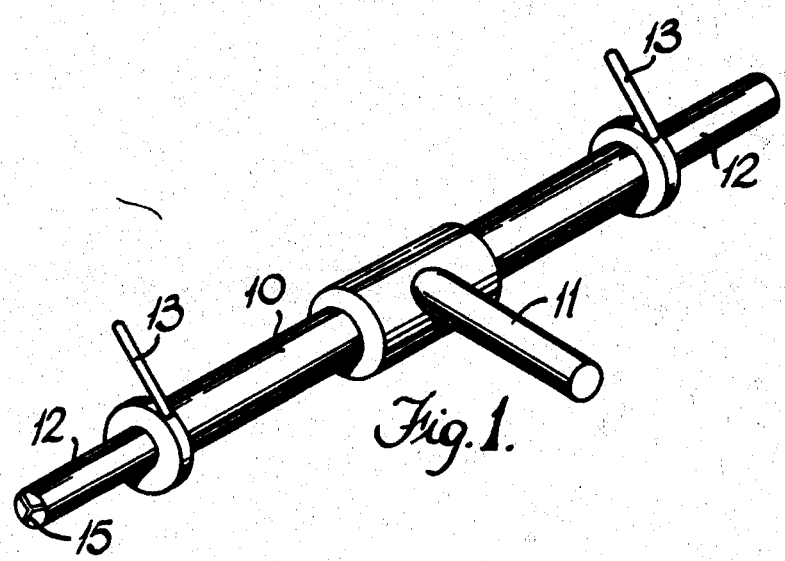
Figure 2:
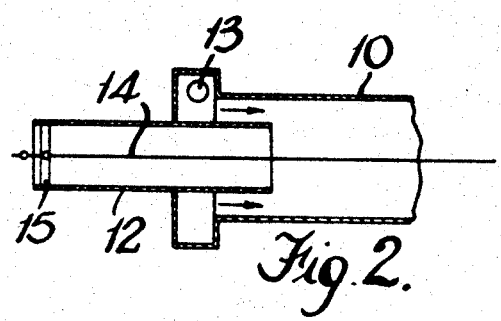

In the accompanying drawings:

FIGURE 1 is a perspective view of one example of a gas purification apparatus in accordance with the invention, and FIGURE 2 is a sectional side elevation of part of the apparatus shown in FIGURE 1.

The apparatus shown in the drawings has been specifically designed for the purification of exhaust gases from an internal combustion engine. The apparatus comprises a tubular chamber 10 having an enlarged portion midway between its ends, and from which extends an outlet 11 for the purified exhaust gases. Extending into the opposite ends of the chamber respectively are a pair of tubes 12 and the ends of the chamber 10 are closed about said tubes.

Also provided are a pair of inlets 13 for the exhaust gas to be purified, and these are located in enlargements of the chamber 10 at the opposite ends thereof. In use, the flow of gas through the inlets 13 induces a flow of air into the chamber through the tubes. Moreover, the inlets are positioned tangentially so as to cause swirling of the gases within the chamber and the outlet is arranged in the direction of the swirl to present the minimum possible resistance to flow.

The chamber 10 is formed from electrically conductive material so that its inner surface is conductive, and this is arranged to be connected to the positive terminal of a high voltage source of D.C. supply. Also provided is an electrode conveniently in the form of a wire 14, which extends axially within the chamber and which is supported by a pair of insulators 15 respectively mounted within the tubes. The electrode 14 is connected to the negative terminal of the source of supply, and in use, particles of dirt from the exhaust gases are deposited onto the interior surface of the chamber by the action of the electrostatic field.

The insulators 15 each comprises a hub portion which is located relative to its associated tube by spoke like portions and the effect of the air drawn into the tubes past the insulaors is to prevent any particles of dirt from the engine exhaust being deposited on the insulators and thereby impairing their efficiency. Moreover, the electrode 14 may be extended upstream of the insulators to clean the incoming air before it reaches the insulators.

In an alternative arrangement (not shown) one of the inlets together with the adjacent tube 12 is omitted and the outlet is disposed at the end of the chamber. In this case the wire electrode is replaced by a rod like electrode which is mounted on the remaining insulator in cantilevered fashion.

Having thus described my invention what I claim as new and desire to secure by Letters Patent is:

1. Gas purification apparatus comprising in combination, a tubular chamber having an electrically conductive inner wall; a tube extending into each end of said chamber and said chamber being closer about said tubes; an electric insulator mounted within each tube, said insulator being arranged to permit the flow of air through said tube; an electrically conductive wire carried by said insulators and extending within said chamber, said wire in use, being maintained at a high electrical voltage relative to said inner chamber wall; a tangential-to-said-chamber inlet for gas to be purified communicating with an annular enlarged portion at each of said ends of said chamber, the action of said gas flowing through said inlet and respective enlarged portion being the sole means for causing air flow through said tube into said chamber and causing swirling of said gas and said air therein, said air acting to maintain the insulator free of particles removed from said gas due to the action of the electric field in said chamber; and a tangential outlet from a further enlarged portion of said chamber disposed intermediate said chamber ends.

2. Apparatus as claimed in claim 1 wherein said wire extends upstream of said insulator to clean the incoming air before it reaches said insulator.

References Cited

UNITED STATES PATENTS

| 617,618 | 1/1899 | Thwaite | 55—108 |
|---|---|---|---|
| 1,332,981 | 3/1920 | Gallot et al. | 55—146 X |
| 1,334,231 | 3/1920 | Davidson | 55—120 X |
| 2,659,449 | 11/1953 | Kaiser et al. | 55—5 |
| 2,726,730 | 12/1955 | MacKenzie | 55—101 |
| 3,033,918 | 5/1962 | Wiemer | 55—120 X |
| 3,116,433 | 12/1963 | Moncrief-Yeates | 313—63 |
| 3,238,702 | 3/1966 | DeSeversky | 55—119 |

FOREIGN PATENTS

| 701,007 | 1/1931 | France. |
|---|---|---|
| 533,036 | 9/1931 | Germany. |
| 120,994 | 12/1918 | Great Britain. |
| 758,063 | 9/1956 | Great Britain. |

HARRY B. THORNTON, Primary Examiner.
D. E. TALBERT, Jr., Assistant Examiner

U.S. Cl. X.R.
55—127, 146, 151, 349, 454, 460